(12) United States Patent
Ko et al.

(10) Patent No.: US 9,036,458 B2
(45) Date of Patent: *May 19, 2015

(54) METHOD FOR SIGNAL TRANSMISSION IN WIRELESS SYSTEMS

(71) Applicants: Samsung Electronics Co., Ltd., Gyeonggi-do (KR); Electronics and Telecommunications Research Institute, Daejeon (KR)

(72) Inventors: Young-Jo Ko, Daejeon (KR); Hyeong-Geun Park, Daejeon (KR); Il-Gyu Kim, Seoul (KR); Kapseok Chang, Daejeon (KR); Hyoseok Yi, Daejeon (KR); Young-Hoon Kim, Daejeon (KR); Seung-Chan Bang, Daejeon (KR)

(73) Assignees: Samsung Electronics Co., Ltd (KR); Electronics and Telecommunications Research Institute (KR)

( * ) Notice: Subject to any disclaimer, the term of this patent is extended or adjusted under 35 U.S.C. 154(b) by 260 days.

This patent is subject to a terminal disclaimer.

(21) Appl. No.: 13/658,417

(22) Filed: Oct. 23, 2012

(65) Prior Publication Data

US 2013/0044729 A1    Feb. 21, 2013

Related U.S. Application Data

(63) Continuation of application No. 12/664,480, filed on Dec. 14, 2009, now Pat. No. 8,295,152.

(30) Foreign Application Priority Data

Jun. 14, 2007    (KR) ........................ 10-2007-0058590

(51) Int. Cl.
*H04L 5/00* (2006.01)
*H04J 13/00* (2011.01)

(52) U.S. Cl.
CPC ........... *H04L 5/0016* (2013.01); *H04J 13/0074* (2013.01); *H04L 5/0037* (2013.01);
(Continued)

(58) Field of Classification Search
CPC . H04J 13/0074; H04L 5/0016; H04L 5/0017; H04L 5/0053; H04L 1/1614
USPC ........................................................ 370/330
See application file for complete search history.

(56) References Cited

U.S. PATENT DOCUMENTS

| 5,946,624 | A  | * | 8/1999  | Petranovich et al. | ......... 455/447 |
| 8,295,152 | B2 | * | 10/2012 | Ko et al.          | ......... 370/203 |
| 2008/0267137 | A1 | | 10/2008 | Dabak et al.       |                  |
| 2010/0135273 | A1 | | 6/2010  | Kim                |                  |

FOREIGN PATENT DOCUMENTS

| WO | WO 2007/062754 | 6/2007  |
| WO | WO 2008/153369 | 12/2008 |

OTHER PUBLICATIONS

Suman Das et al., "EV-DO Revision C: Evolution of the CDMA2000 Data Optimized System to Higher Spectral Efficiencies and Enhanced Services".

(Continued)

*Primary Examiner* — Xavier S. Wong
(74) *Attorney, Agent, or Firm* — The Farrell Law Firm, P.C.

(57) ABSTRACT

A method is provided for forming a signal in a wireless communication system in which a plurality of terminals commonly use time and frequency resources for efficient code hopping. The method includes allocating the same frequency-axis sequence and different time-axis sequences to a plurality of terminals by using a resource index according to a first slot in the first slot; and allocating different frequency-axis sequences and different time-axis sequences to the plurality of terminals by using a resource index according to a second slot in the second slot.

20 Claims, 9 Drawing Sheets

(52) U.S. Cl.
CPC ............ *H04L5/0053* (2013.01); *H04L 5/0017* (2013.01); *H04L 5/0019* (2013.01); *H04L 5/0021* (2013.01); *H04L 5/0048* (2013.01); *H04L 5/0055* (2013.01)

(56) References Cited

OTHER PUBLICATIONS

Bell Labs Technical Journal, vol. 11, Issue 4, Mar. 9, 2007.
Rainer Bachl et al., "The Long Term Evolution Towards a New 3GPP Air Interface Standard", Bell Labs Technical Journal, vol. 11, Issue 4, Mar. 9, 2007.

KDDI, NTT DoCoMo, "CDMA based Multiplexing of ACK/NACK and CQI Control Information in E-UTRA Uplink", 3GPP TSG RAN WG1 Meeting #49, R1-072480, May 2, 2007.
Nokia Siemens Networks, Nokia, "Cyclic Shift Hopping and DM RS Signaling", 3GPP TSG RAN WG1 Meeting #49, R1-072294, May 2, 2007.
Motorola, "Reference Signal Structure for UL ACK/NACK", 3GPP TSG RAN1 #49, R1-072187, May 2, 2007.
Texas Instruments, "Transmission of Downlink CQI in E-UTRA Uplink", 3GPP TSG RAN WG1 #49, R1-072212, May 2, 2007.
Qualcomm Europe, "Cyclic Shift Hopping and Link Performance of UL ACK and CQI Channels", 3GPP TSG RAN1 #48, R1-070661, Feb. 6, 2007.

\* cited by examiner

METHOD FOR SIGNAL TRANSMISSION IN WIRELESS SYSTEMS

PRIORITY

This application is a Continuation of U.S. application Ser. No. 12/664,480, which was filed in the U.S. Patent and Trademark Office on Dec. 14, 2009, and is a National Phase Entry of PCT International Application No. PCT/KR08/03396, which was filed on Jun. 16, 2008, and claims priority to Korean Patent Application Serial No. 10-2007-0058590, which was filed in the Korean Intellectual Property Office on Jun. 14, 2007, the entire disclosure of each of which is incorporated herein by reference.

BACKGROUND OF THE INVENTION

1. Field of the Invention

When a plurality of terminals simultaneously use an acknowledgement/negative acknowledgement (ACK/NACK) channel in a wireless communication system, code division multiplexing (CDM) may be used to allow for the plurality of terminals. In CDM, each of the plurality of terminals transmits a signal multiplied by a spreading code allocated thereto.

The present invention relates to code hopping for efficiently mitigating interference among terminals in the same cell and between terminals of adjacent cells when each of a plurality of terminals uses a spreading code along a frequency axis and a spreading code along a time axis.

The present invention is derived from a research project partly supported by the Information Technology (IT) Research & Development (R&D) program of the Ministry of Information and Communication (MIC) and the Institute for Information Technology Advancement (IITA) [2005-S-404-13, Development of Radio Transmission Technology for 3G Evolution].

2. Description of the Related Art

The present invention relates to a method of transmitting an acknowledgement/negative acknowledgement (ACK/NACK) signal by a terminal as a response to data received from a base station.

A receiver sends an ACK signal to a transmitter when the receiver is successful in demodulating received data, and sends a NACK signal to the transmitter when the receiver is unsuccessful in demodulating the received data. Each of the ACK/NACK signal is expressed as one bit per codeword. A plurality of terminals should be able to simultaneously transmit their ACK/NACK signals by using given time and frequency resources through multiplexing.

Multiplexing techniques are classified into frequency division multiplexing (FDM) and code division multiplexing (CDM). While FDM is a form of multiplexing where a plurality of terminals use different time and frequency resources, CDM is a form of multiplexing where a plurality of terminals use the same time/frequency resources but transmit signals multiplied by orthogonal codes so as for a receiver to distinguish the plurality of users.

In uplink, a Zadoff-Chu sequence is widely used because it has an ideal peak to average power ratio (PAPR). Such a Zadoff-Chu sequence achieves orthogonality between terminals through cyclic delay without multiplying a signal by a specific code in a frequency domain.

A terminal transmits an uplink ACK/NACK signal to a base station to signify successful or unsuccessful receipt of downlink data. The uplink ACK/NACK signal requires one bit per codeword used to transmit the downlink data.

FIG. 1 illustrates time/frequency resources used by a terminal to transmit an uplink ACK/NACK signal through a control channel in a 3rd generation partnership projection long term evolution (3GPP LTE) system. Referring to FIG. 1, resources used by one control channel are grouped into two separate resource blocks. Each of the two resource blocks includes N subcarriers along a frequency axis, and 7 orthogonal frequency division multiplexing (OFDM) symbols, which corresponds to one slot, along a time axis. One slot has a length of 0.5 ms.

In FIG. 1, a plurality of terminals may commonly use one control channel. That is, one control channel may be shared by the plurality of terminals.

In this case, in order to distinguish the plurality of terminals using the same control channel, a specific code sequence is allocated to each of the plurality of terminals. That is, each of the plurality of terminals forms and transmits a signal spread on a frequency axis and a time axis by using its own specific code.

FIG. 2 illustrates a code sequence and a symbol transmitted to each of N subcarriers in an ACK/NACK channel occupying a resource block that includes the N subcarriers on a frequency axis and 7 OFDM symbols on a time axis. In FIG. 2, the resource block corresponding to one slot described with reference to FIG. 1 occupies N subcarriers on a frequency axis and includes 7 symbol blocks BL #0 through #6 on a time axis.

When CDM is used in order to distinguish signals of a plurality of terminals, a symbol and a sequence may be mapped to each time/frequency resource as shown in FIG. 2. In order to distinguish the plurality of terminals, a sequence is applied to each of the frequency axis and the time axis. In FIG. 2, a reference signal is used for channel estimation, and predetermined signal is communicated between a terminal and a base station.

The base station estimates a channel by using a reference signal, and demodulates an ACK/NACK symbol transmitted by a control signal by using the estimated channel. Each time/frequency resource transmits a signal multiplied by two or three symbols.

That is, a time/frequency resource on which a reference signal is transmitted is obtained by multiplying a frequency-axis sequence symbol $C_q^m(k)$ a time-axis sequence symbol $R_i$ (i=0, 1, 2). A time/frequency resource on which a control signal is transmitted is obtained by multiplying a frequency-axis sequence symbol $C_q^m(k)$, a time-axis sequence symbol $C_i$ (i=0, 1, 2, 3), and an ACK/NACK symbol Q.

In FIG. 2, the frequency-axis sequence symbol $C_q^m(k)$ is given by Equation (1).

$$C_q^m(k) = \exp\left[i\frac{2\pi}{N_{ZC}}m\left(\frac{(k-q)(k-q+1)}{2}\right)\right], k = 0, 1, 2, \ldots, N-1 \quad (1)$$

In Equation (1), $N_{ZC}$ is the length of a Zadoff-Chu sequence applied to a $k^{th}$ subcarrier on the frequency axis. The small letter m is a primary index, and q is a cyclic delay index.

One sequence is applied to each of a reference signal and a control signal along the time axis. That is, a sequence applied to a control signal in FIG. 2 is expressed as $C_0, C_1, C_2, C_3$. A sequence applied to a reference signal is expressed as $R_0, R_1, R_2$.

Currently, in 3GPP LTE, three reference signals per slot are used for an uplink ACK/NACK channel.

Also, in order to distinguish terminals, a Zadoff-Chu sequence along a frequency axis is used and a discrete Fourier transformation (DFT) vector, a Walsh-Hadamard sequence, or a Zadoff-Chu sequence along a time axis may be used.

SUMMARY OF THE INVENTION

Accordingly, an aspect of the present invention to provide an improved method of forming a signal in a wireless communication system in which a plurality of terminals commonly use time and frequency resources.

In accordance with an aspect of the invention, a method is provided for forming a signal in a wireless communication system in which a plurality of terminals commonly use time and frequency resources. The method includes allocating the same frequency-axis sequence and different time-axis sequences to a plurality of terminals by using a resource index according to a first slot in the first slot; and allocating different frequency-axis sequences and different time-axis sequences to the plurality of terminals by using a resource index according to a second slot in the second slot.

In accordance with another aspect of the present invention, there is provided a method of forming a signal in a wireless communication system in which a plurality of terminals commonly use time and frequency resources, the method comprising: allocating the same frequency-axis sequence and different time-axis sequences to a plurality of terminals by using a resource index according to a first slot in the first slot; and allocating different frequency-axis sequences to the plurality of terminals by using a resource index according to a second slot in the second slot.

In accordance with another aspect of the present invention, there is provided a method of forming a signal in a wireless communication system in which a plurality of terminals commonly use time and frequency resources, the method comprising: causing one or more terminals, which use the same frequency axis code and different time axis codes in a first slot, to constitute a terminal group for a reference signal symbol block; causing one or more terminals, which use the same frequency axis code and different time axis codes in a first slot, to constitute a terminal group for a control signal symbol block, which is independent from the terminal group for the reference signal symbol block; causing the one or more terminals belonging to the same terminal group for the reference signal symbol block in the first slot to belong to different terminal groups for a reference signal symbol block in a second slot; and causing the one or more terminals belonging to the same terminal group for the control signal symbol block in the first slot to belong to different terminal groups for a control signal symbol block in a second slot.

In accordance with another aspect of the present invention, there is provided a method of forming a signal in a wireless communication system in which a plurality of terminals commonly use time and frequency resources, the method comprising: causing one or more terminals, which use the same frequency axis code and different time axis codes in a first symbol block, to constitute one terminal group on one frequency code; and causing the one terminal group to use a frequency axis code, which is different from the frequency axis code used in the first symbol bock, in a second symbol block different from the first symbol block in one slot.

In accordance with another aspect of the present invention, there is provided a code hopping method for reducing interference between terminals in a wireless communication system in which a plurality of terminals commonly use time and frequency resources, the code hopping method comprising: causing one or more groups, which use the same frequency axis code and different time axis codes in a first slot, to constitute one terminal group; and, when a time axis code length is less than a slot length, changing a terminal group according to the time axis code length achieving orthogonality so that the one or more terminals belonging to the same terminal group in the first slot belong to different terminal groups in a second slot.

In accordance with another aspect of the present invention, there is provided a terminal using code hopping in a wireless communication system, the terminal apparatus comprising: a resource index receiving unit receiving a resource index that is changed according to a change in a slot or a symbol block; a frequency-axis code sequence allocating unit determining a frequency-axis code sequence according to the received resource index and allocating the determined frequency-axis code sequence to a terminal; and a time-axis code sequence allocating unit determining a time-axis code sequence according to the received resource index and allocating the determined time-axis code sequence to the terminal.

In accordance with another aspect of the present invention, there is provided a base station using code hopping in a wireless communication system, the base station comprising: a resource index transmitting unit transmitting a resource index that is changed according to a change in a slot or a symbol to terminals; a frequency-axis code sequence determining unit determining a frequency-axis code sequence according to the resource index; and a time-axis code sequence determining unit determining a time-axis code sequence according to the resource index.

DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

In a wireless communication system, acknowledgement/negative acknowledgement (ACK/NACK) control information sent by a terminal to a base station in order to signify that the terminal is successful or unsuccessful in demodulating data is transmitted and received. In order to efficiently transmit and receive such ACK/NACK control information, the same ACK/NACK resources are used by a plurality of terminals, thereby causing interference between terminals in a cell or between terminals of adjacent cells. In order to mitigate the interference, there is a demand for efficient code hopping.

As described above, when acknowledgement/negative acknowledgement (ACK/NACK) control information sent by a terminal to a base station in a wireless communication system is transmitted and received, the present invention can efficiently mitigate interference between terminals in a cell or between terminals of adjacent cells which is caused when a plurality of terminals use the same ACK/NACK resources.

A code hopping method and apparatus for mitigating interference between terminals in a wireless communication system according to the present invention will now be described more fully with reference to the accompanying drawings, in which exemplary embodiments of the invention are shown.

Detailed explanation will not be given when it is determined that detailed explanation about well-known functions and configurations of the present invention may dilute the point of the present invention. Terms used hereinafter are used considering the functions in the present invention and may be changed according to a user's or operators intention or usual practice. Accordingly, the terms will be defined based on the entire content of the description of the present invention.

In particular, the term "frequency axis code" or "frequency axis code index" used hereinafter is interchangeable with "cyclic shift" or "cyclic shift index", and the term "time axis code" or "time axis code index" used hereinafter is interchangeable with "orthogonal cover" or "orthogonal cover index".

Figure 1:
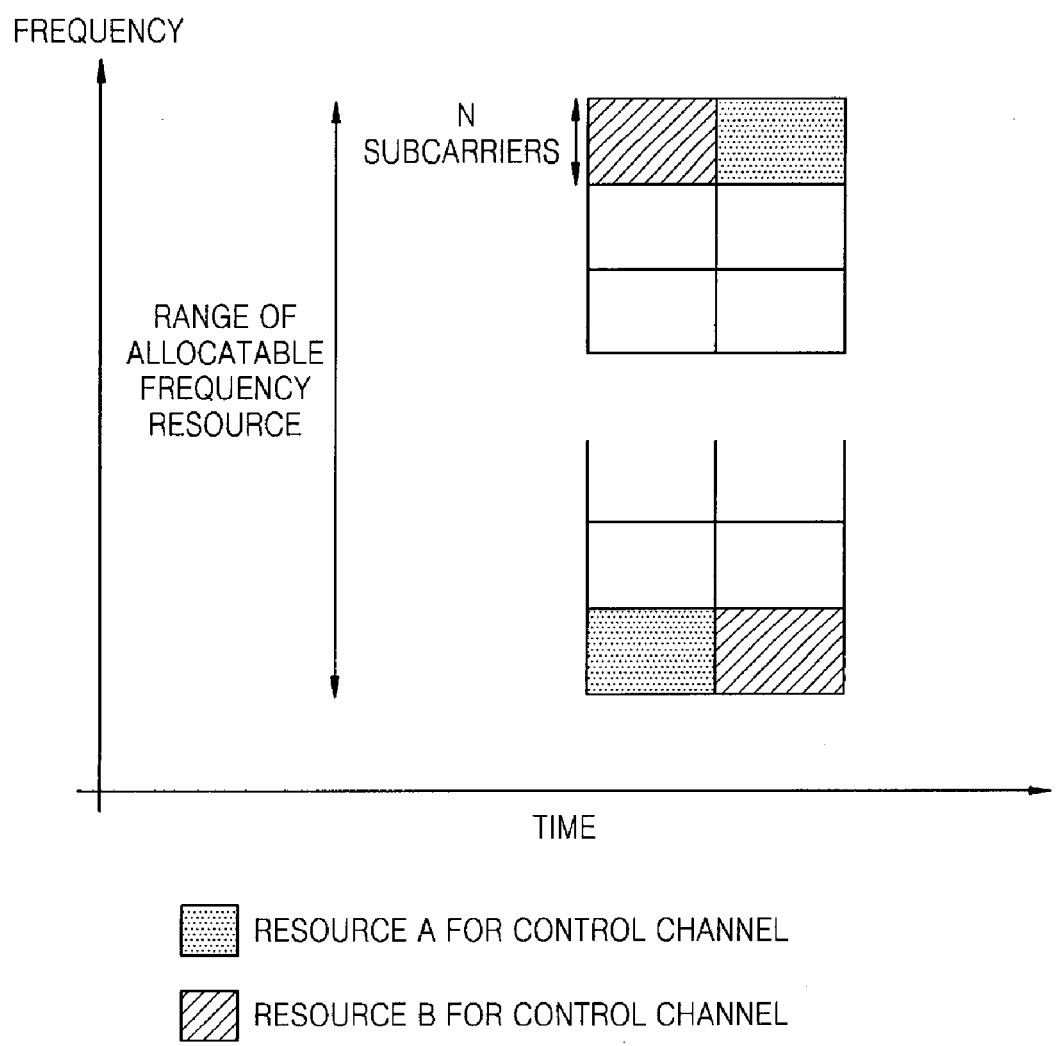
FIG. 1 illustrates time/frequency resources used by a terminal to transmit an uplink acknowledgement/negative acknowledgement (ACK/NACK) signal through a control channel in a $3^{rd}$ generation partnership projection long term evolution (3GPP LTE) system.
Figure 2:
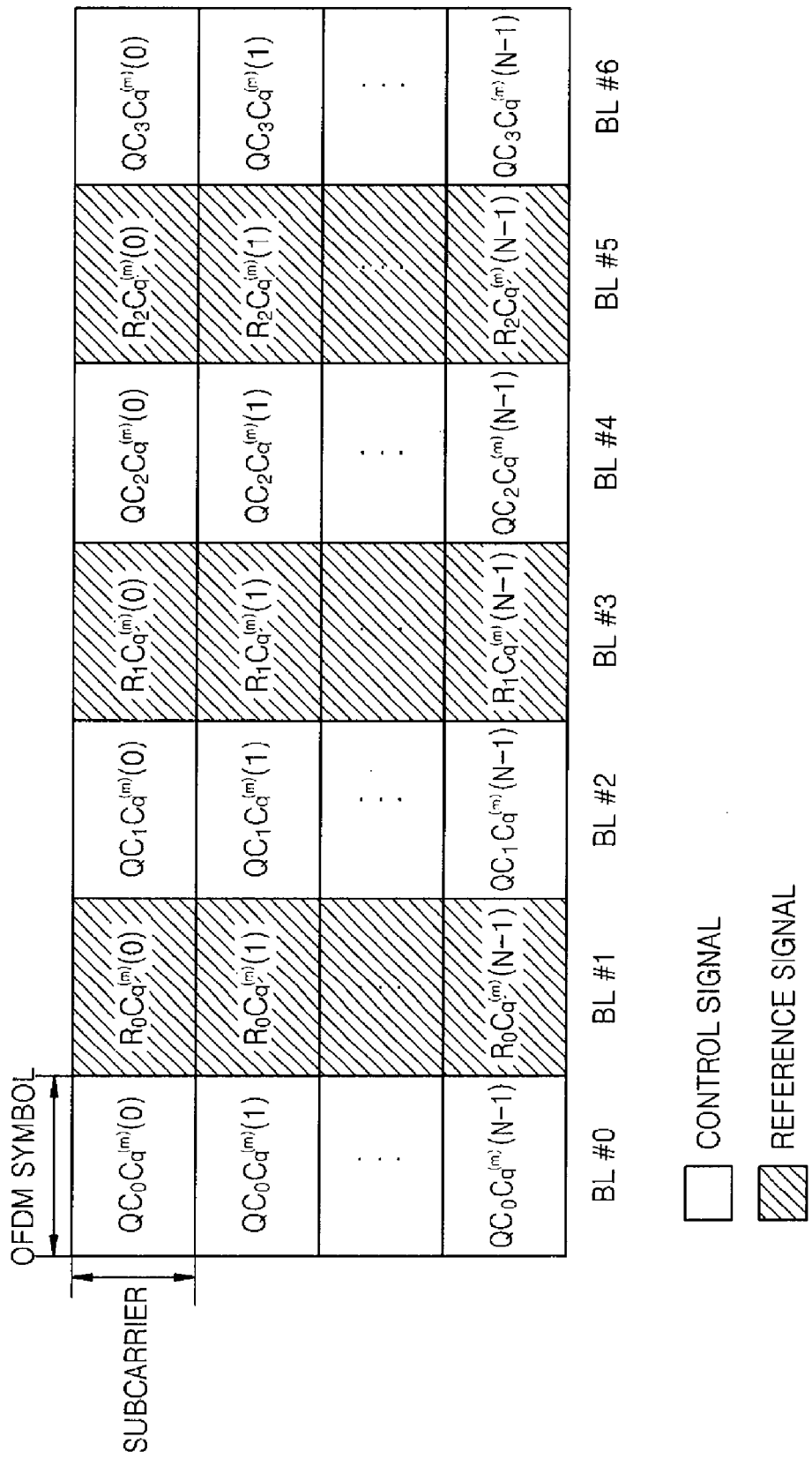
FIG. 2 illustrates a code sequence and a symbol transmitted to each of subcarriers in an ACK/NACK channel having the N subcarriers on a frequency axis and 7 orthogonal frequency division multiplexing (OFDM) symbols on a time axis.
Figure 3:
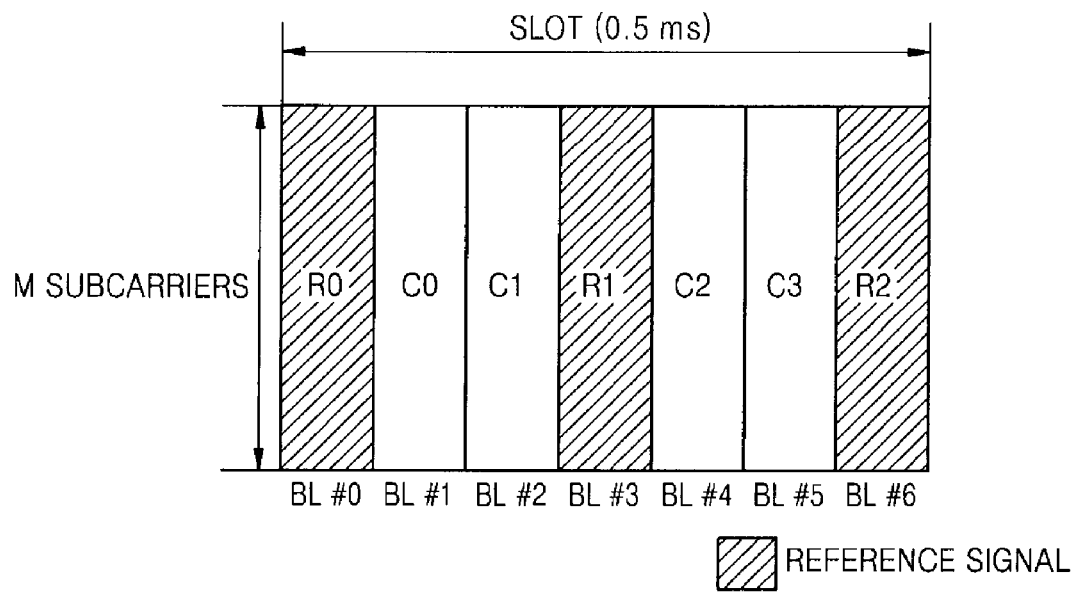
FIG. 3 illustrates a slot structure of an ACK/NACK channel including 3 reference signals per slot, according to an embodiment of the present invention.
Figure 4:
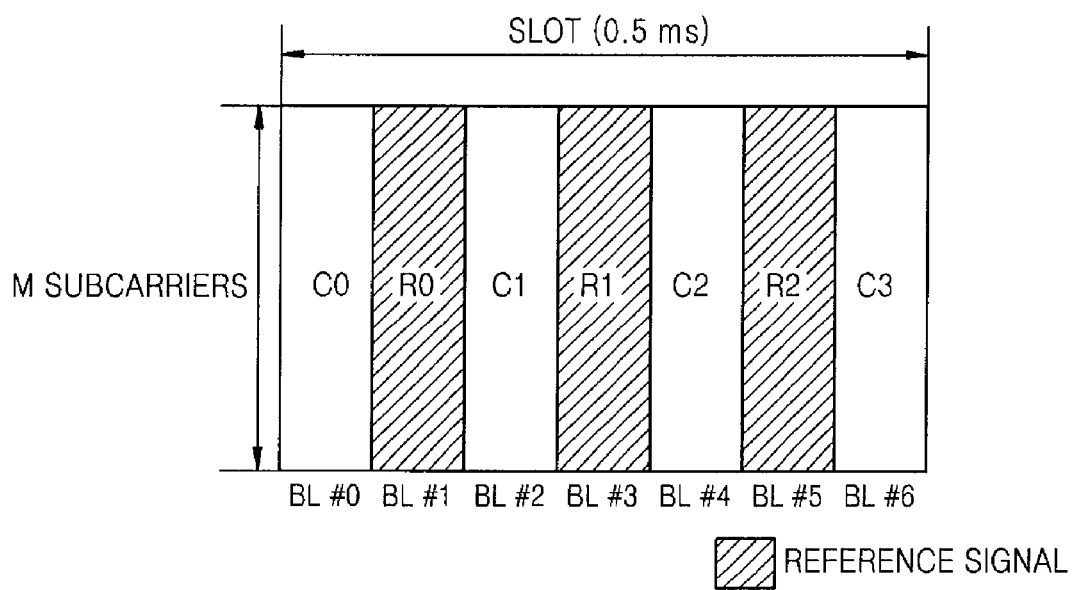
FIG. 4 illustrates a slot structure of an ACK/NACK channel including 3 reference signals per slot, according to another embodiment of the present invention.
Figure 5:
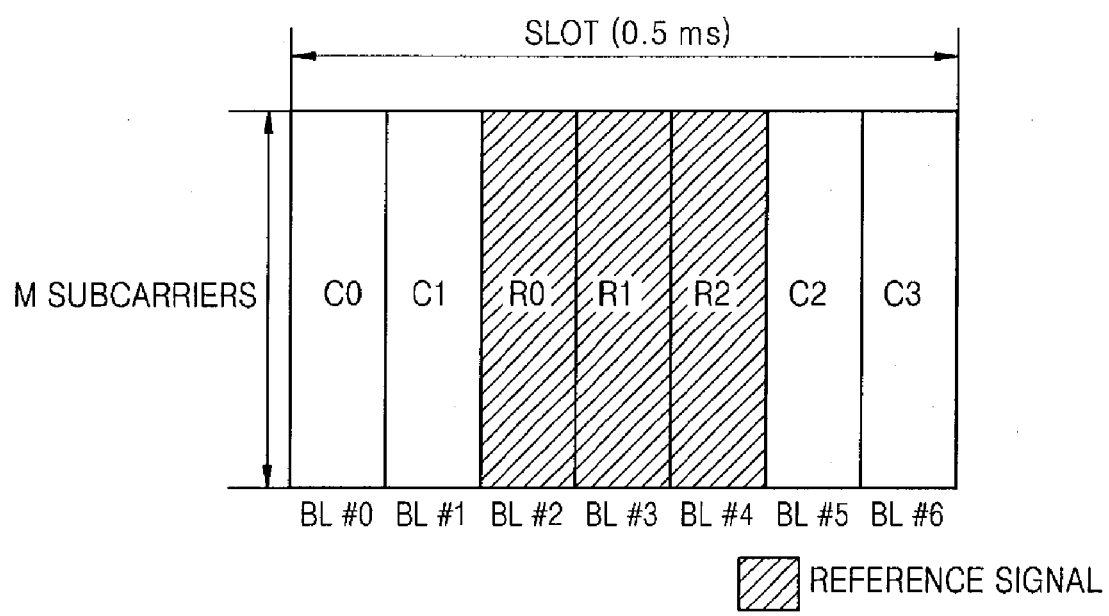
FIG. 5 illustrates a slot structure of an ACK/NACK channel including 3 reference signals per slot, according to another embodiment of the present invention.

FIGS. 3 through 5 illustrate slot structures of acknowledgement/negative acknowledgement (ACK/NACK) channels, each slot structure including 3 reference signals per slot, according to embodiments of the present invention.

Referring to FIGS. 3 through 5, one slot includes 3 reference signals and 4 control signals.

When a plurality of terminals are used, a receiver should be able to receive and distinguish reference signals transmitted by the plurality of terminals, and also should receive and distinguish control signals transmitted by the plurality of terminals.

In order to distinguish signals, code division multiplexing (CDM) using both frequency and time resources may be used as described above.

In CDM, a time-axis sequence is an orthogonal sequence. When the number of continuous orthogonal frequency division multiplexing (OFDM) symbols along a time axis is $N_t$, a sequence length may be $N_t$ and $N_t$ sequences achieving orthogonality therebetween may be formed. When an $i^{th}$ sequence is expressed as a row vector $G_i=[C_{i,0}, C_{1,1}, \ldots, C_{i,N_{t-1}}]$, orthogonality is given by Equation (2).

$$G_i \cdot G_j^+ = [C_{i,0}, C_{i,1}, \ldots, C_{i,N_t-1}] \cdot \begin{bmatrix} C_{j,0}^* \\ C_{j,1}^* \\ \ldots \\ \ldots \\ C_{j,N_t-1}^* \end{bmatrix} = \sum_{k=0}^{N_t-1} C_{i,k} C_{j,k}^* = N_t \delta_{i,j} \quad (2)$$

In Equation (2), $$\delta_{i,j} = \begin{cases} 1 \text{ if } i = j \\ 0 \text{ if } i \neq j \end{cases}.$$

Theoretically, since the total number of resources on a frequency axis is M and there are 3 reference signals in FIGS. 3 through 5, M×3 reference signals in total can be distinguished by CDM.

Since the total number of resources on the frequency axis is M and there are 4 control signals in FIGS. 3 through 5, M×4 control signals can be distinguished by CDM.

However, since each terminal should transmit at least one reference signal in order for a base station to demodulate a control signal by using the reference signal, the total number of distinguishable terminals is M×3. In this case, an orthogonal sequence having a spreading factor (SF) of 3 is used for the reference signals, and an orthogonal sequence having an SF of 4 is used for the control signals.

Code hopping for efficiently mitigating interference according to the present invention will now be explained. Code hopping is performed on both or each of a frequency axis code and a time axis code.

(1) Code Hopping on Symbol Block-by-Symbol Block Basis

One frequency-axis code sequence and one time-axis code sequence are allocated to each terminal. It is assumed that a frequency axis code and a time axis code which are used by an $i^{th}$ terminal in a $t^{th}$ block of an $s^{th}$ slot are expressed as $q_{i,t,s}$ and $r_{i,s}$, respectively. In a multiplexing structure, 3 or less terminals in one symbol block use the same frequency axis code and different time axis codes that are transmitted through a plurality of blocks.

The present invention is not limited to the slot structures of FIGS. 3 through 5, and the number of symbol blocks included in a slot may vary.

A Zadoff-Chu sequence of Equation 1 may be applied to a frequency axis code. However, the frequency axis code is not limited to the Zadoff-Chu sequence, and may use any sequence that achieves orthogonality.

At this time, a frequency axis code, which is used by a plurality of terminals in the same cell, has the same primary index and different cyclic delay indices. However, terminals belonging to different cells have different primary indices.

A frequency axis code used by each terminal may be changed according to a block index "t". It is assumed that a frequency axis code used by an $i^{th}$ terminal for blocks belonging to an $s^{th}$ slot is expressed as $\{q_{i,s,t=0}, q_{i,s,t=1}, q_{i,s,t=2}, \ldots, q_{i,s,t=7}\}$. A time axis code may be expressed as $r_{i,s}$. If frequency axis codes used for a first symbol block by a $j^{th}$ terminal and an $i^{th}$ terminal are the same, the same frequency axis code should be used for remaining symbol blocks. That is, when $\{q_{i,s,t=0}=q_{j,s,t=0}$, then $q_{i,s,t=k}=q_{j,s,t=k}$ ($k=1, 2, 3, \ldots, 6$) should be satisfied. That is, frequency axis codes used by two terminals in all symbol blocks should be the same. Also, if $q_{i,s,t=k} \neq q_{j,s,t=k}$, (then a $q_{i,s,t=k} \neq q_{j,s,t=k}$ (k=1, 2, 3, ..., 6) should be satisfied. That is, frequency axis codes used by two terminals in all symbol blocks in the same slot should be different from each other. The aforementioned code hopping may be implemented as follows.

For starters, a terminal group is defined as follows. One terminal group includes one or more terminals that use the same frequency axis and different orthogonal time axis codes. A plurality of terminals groups are generated on a frequency axis, and one frequency code hopping pattern corresponds to each of the plurality of terminal groups.

Since the one or more terminals belonging to the same terminal group use the same frequency axis code even when blocks are changed, orthogonality on a time axis between the terminals can be maintained.

If the terminals constituting the same terminal group are changed as a symbol block index is changed, orthogonality on a time axis between the terminals is broken, resulting in interference between the terminals.

Figure 6:
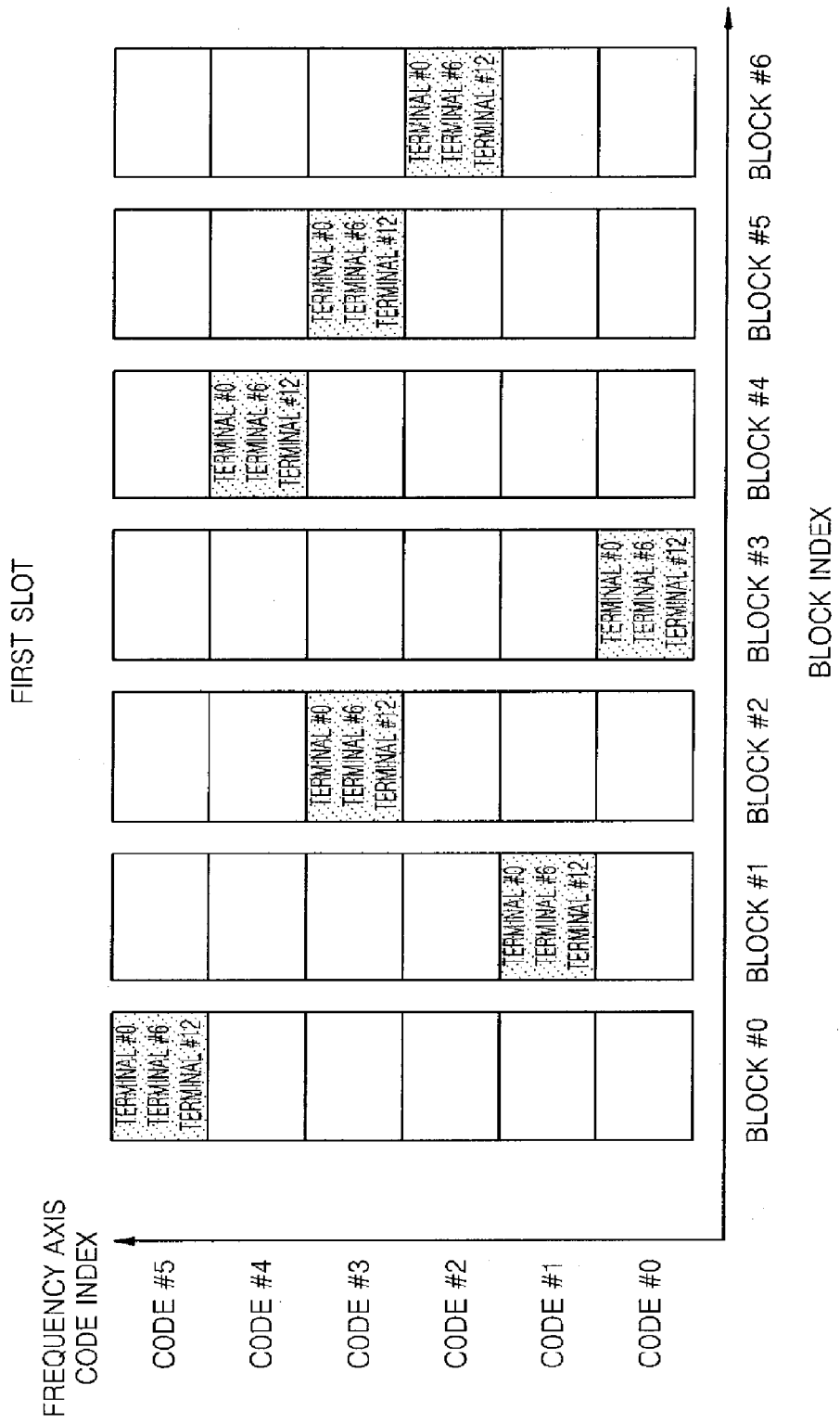
FIG. 6 illustrates a frequency code hopping pattern of a terminal group including one or more terminals in a first slot, according to an embodiment of the present invention.

FIG. 6 illustrate frequency code hopping patterns of terminal groups each including one or more terminals in a first slot and a second slot, respectively, according to embodiments of the present invention.

Referring to FIG. 6, a terminal #0, a terminal #6, and a terminal #12 constitute one terminal group. A frequency axis code commonly allocated to the three terminals #0, #6, and #12 is changed as a symbol block is changed. Accordingly, code hopping is carried out on a symbol block-by-symbol block basis.

In other words, the terminals #0, #6, and #12 of the terminal group in a first symbol block use the same frequency axis code but each terminal uses different time axis code. In a second symbol block, the terminals #0, #6, and #12 of the terminal group use a new frequency axis code different from that in the first symbol block, thereby performing code hopping on a symbol block-by-symbol block basis.

(2) Code Hopping on Slot-by-Slot Basis

Code hopping performed on a slot-by-slot basis will now be explained.

An uplink ACK/NACK channel includes two slots. A plurality of terminal signals are introduced through an ACK/NACK channel in code division multiple access (CDMA). At this time, terminal speeds and powers are different from one another. A terminal group is formed for each slot, and terminals belonging to the same terminal group in a first slot belong to different terminal groups in a second slot in order to mitigate interference between the terminals, thereby improving receiving performance.

Terminals in a terminal group are distinguishable by using different time axis codes as described above. For example, a specific terminal in a terminal group may have a high speed or high power because of incomplete power control. Other terminals are interfered by this specific terminal. In particular, remaining terminals other than the specific terminal in the same terminal group are most severely interfered by the specific terminal.

If constituent terminals of a terminal group are changed according to a slot such that terminals belonging to the same terminal group in a first slot belong to different terminal groups in a second slot, interference due to the specific terminal may be mitigated.

Code hopping performed on a slot-by-slot basis will now be explained with reference to FIGS. 6 and 7 in further detail.

Referring to FIG. 6, the terminals #0, #6, and #12 constitute one terminal group for each symbol block in the first slot. The terminals #0, #6, and #12 constituting one terminal group in FIG. 6 do not belong to the same terminal group in the second slot in FIG. 7.

Figure 7:
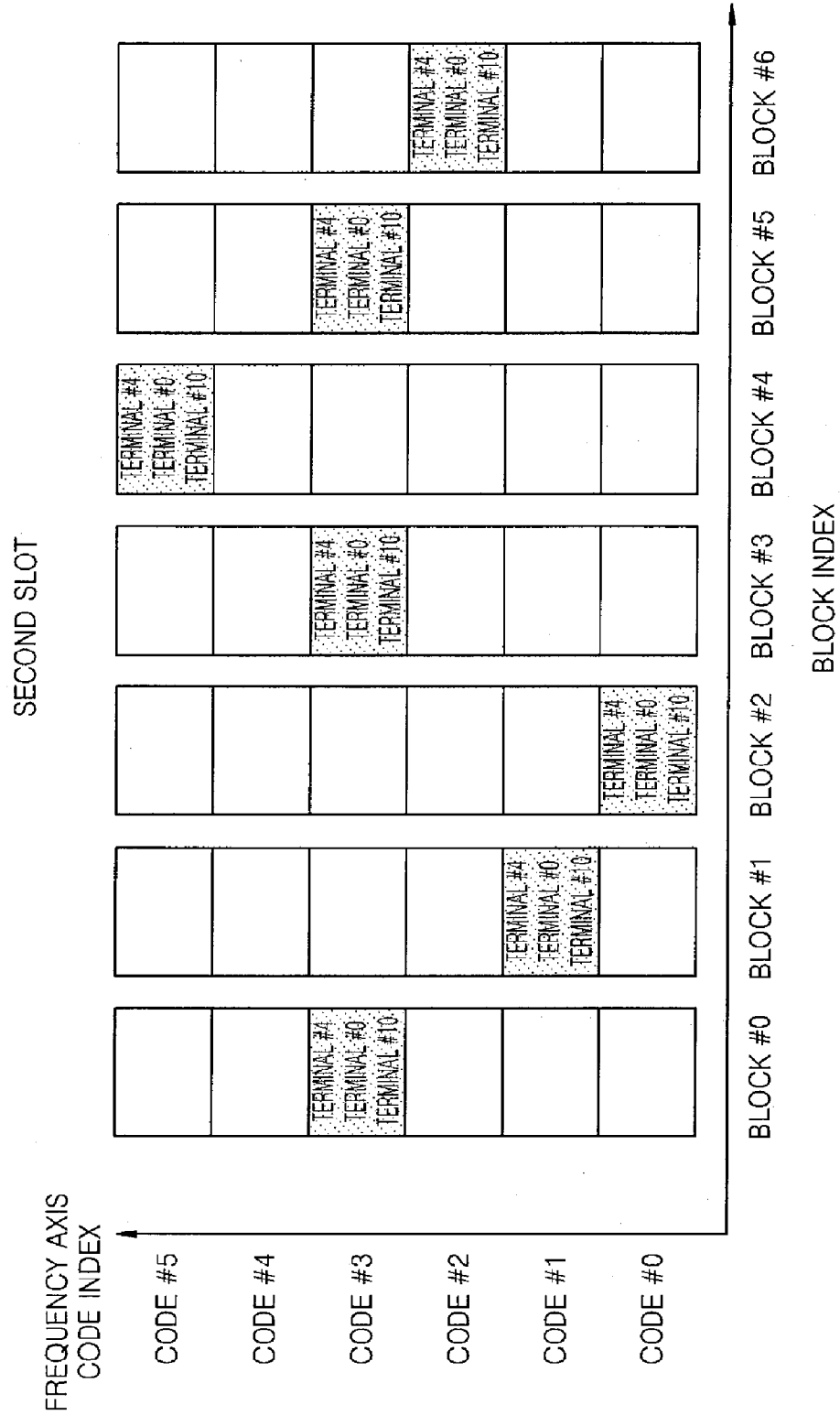
FIG. 7 illustrates a frequency code hopping pattern of a terminal group including one or more terminals in a second slot, according to an embodiment of the present invention.

Referring to FIG. 7, in the second slot, terminals #4, #10, and #0 constitute a new terminal group. The terminals #6 and #12 constituting the same terminal group together with the terminal #0 in the first slot belong to different terminal groups in the second slot. For example, the terminal #6 constitutes a new terminal group in the second slot together with terminals that belong to different terminal groups in the first slot. The rearrangement of terminals is performed by determining a frequency axis code and a time axis code according to resource indices corresponding to each slot and changing terminals constituting a terminal group. A method of changing a time axis code will be explained later in detail.

Accordingly, terminals belonging to the same terminal group in the first slot may not belong to the same terminal group in the second slot, and may constitute a new terminal group together with other terminals.

The code hopping performed on the slot-by-slot basis can randomize and average interference between terminals. That is, since a terminal with high power in a first slot does not belong to the same terminal group in a second slot, interference can be mitigated.

The code hopping performed on the slot-by-slot basis may change a time axis code allocated to each terminal when a terminal group is changed according to slots. That is, a time axis code allocated to the terminal #0 in FIG. 6 and a time axis code allocated to the terminal #0 in FIG. 7 may be different from each other.

Figure 8:
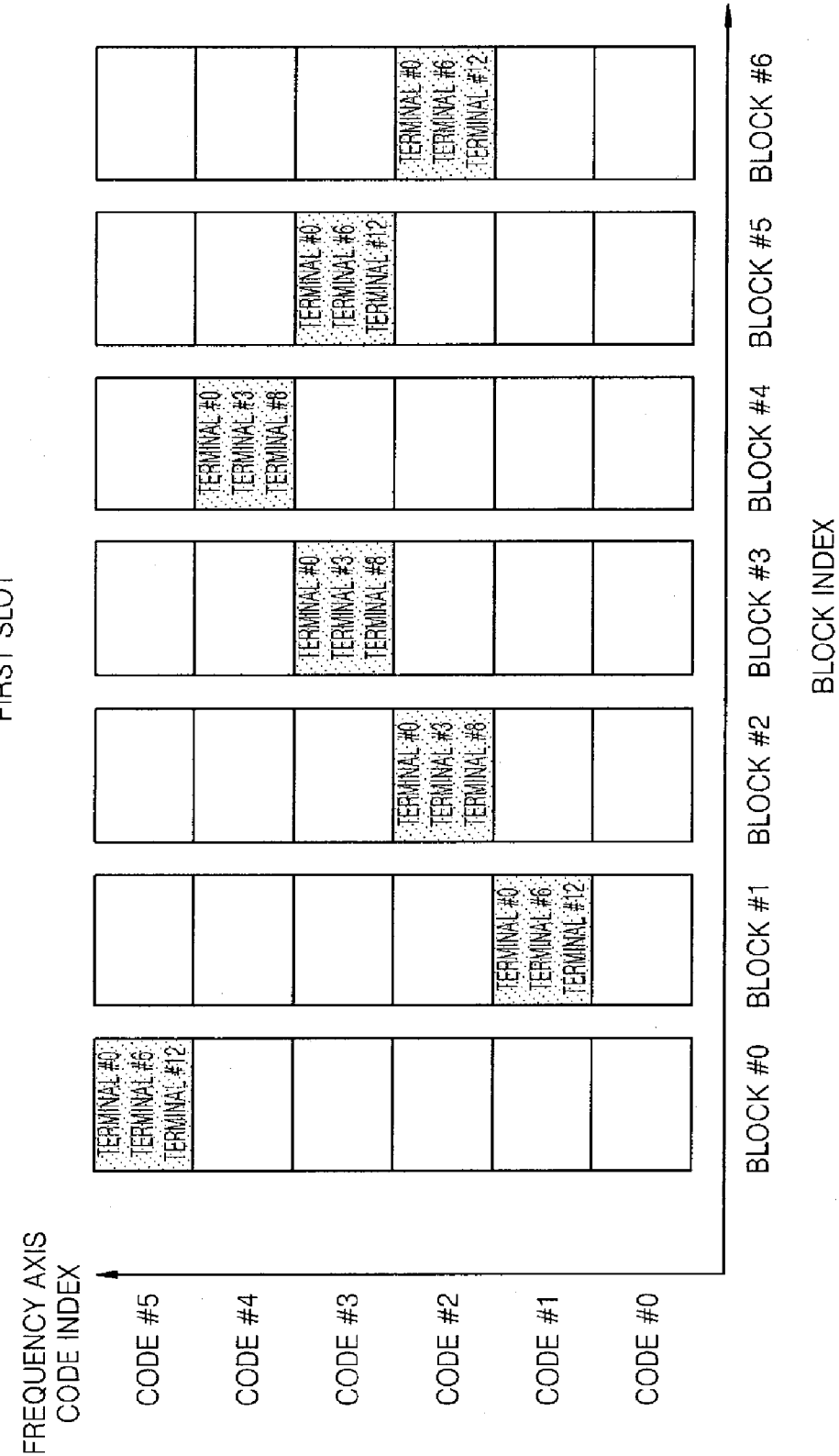
FIG. 8 illustrates a frequency code hopping pattern of a terminal group including one or more terminals in a first slot in the slot structure of FIG. 5, according to an embodiment of the present invention.
Figure 9:
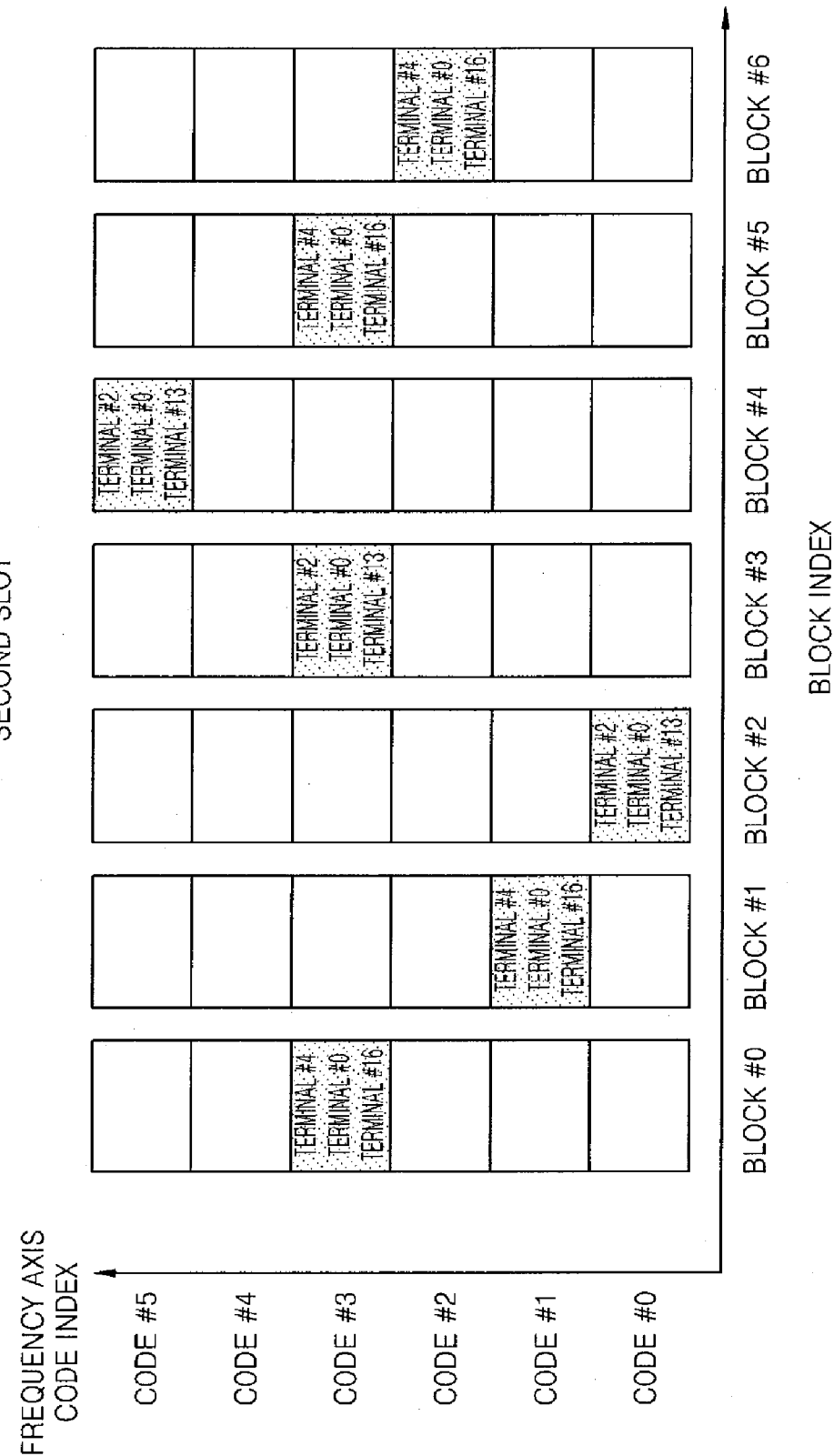
FIG. 9 illustrates a frequency code hopping pattern of a terminal group including one or more terminals in a second slot in the slot structure of FIG. 5, according to an embodiment of the present invention.

FIGS. 8 and 9 illustrate frequency code hopping patterns of terminal groups each including one or more terminals in a first slot and a second slot, respectively, in the slot structure C of FIG. 5, according to embodiments of the present invention.

In this case, code hopping is independently performed for a reference signal symbol block and a control signal symbol block. In FIGS. 8 and 9, it is assumed that a time axis code having a length of 4 is used for control signal symbol blocks #0, #1, #5, and #6, whereas a time axis code having a length of 3 is used for reference signal symbol blocks #2, #3, and #4. A terminal group used in a control signal symbol block and a terminal group used in a reference signal symbol block may be different from each other as shown in FIGS. 8 and 9.

A terminal group defined in the control signal symbol blocks #0, #1, #5, and #6 in the first slot of FIG. 8 and a terminal group defined in the control signal symbol blocks #0, #1, #5, and #6 in the second slot of FIG. 9 are different from each other. Terminals constituting the same terminal group together with the terminal #0 in the first slot belong to terminal groups different from that of the terminal #0 in the second slot.

For example, while terminals #0, #6, and #12 constitute one terminal group in the first slot of FIG. 8, terminals #4, #0, and #16 constitute one terminal group in the second slot of FIG. 9. Accordingly, terminals constituting the same terminal group together with the terminal #0 in the first slot belong to terminal groups different from that of the terminal #0 in the second slot.

A terminal group defined in the reference signal symbol blocks #2, #3, and #4 in the first slot of FIG. 8 is different from a terminal group defined in the reference signal symbol blocks #2, #3, and #4 in the second slot of FIG. 9. While terminals #0, #3, and #8 constitute a terminal group in the reference signal symbol block #2 in the first slot of FIG. 8, terminals #2, #0, and #13 constitute a terminal group in the reference signal symbol block #2 in the second slot of FIG. 9. That is, terminals constituting the same terminal group together with the terminal #0 in the first slot belong to terminal groups from that of the terminal #0 in the second slot.

When a terminal group is changed, a time axis code allocated to each terminal may be changed. A time axis code allocated to the terminal #0 in FIG. 8 and a time axis code allocated to the terminal #0 in FIG. 9 may be different from each other. When a time axis code allocated to a terminal is changed whenever a terminal group is changed, interference caused by the use of a specific time axis code may be mitigated.

(3) Code Hopping Changing Terminal Group According to Time Axis Code Length Basis When a time axis code length does not occupy one slot, a terminal group may be changed according to a time axis code length basis. A method of changing a terminal group according to a time axis code length basis in code hopping will now be explained.

In the frequency code hopping patterns of FIGS. 3 through 5, when a time axis code length is 2, one time axis code is transmitted in two control signal symbol blocks C0 and C1, and another time axis code is transmitted in remaining control signal symbol blocks C2 and C3.

In this case, a terminal group is changed every 2 control signal symbol blocks. When a time axis code having a length of 3 is applied to reference signal symbol blocks R0, R1, and R2, a terminal group is not changed in the reference signal symbol blocks R0, R1, and R2.

Whenever a terminal group is changed, a time axis code allocated to each terminal may be changed. When a time axis code length of 2 is applied to the control signal symbol blocks, C0, C1, C2, and C3, 4 time axis codes are transmitted for one terminal.

That is, a time axis code applied to the control signal symbol blocks C0 and C1 of a first slot, a time axis code applied to the control signal symbol blocks C2 and C3 of the first slot, a time axis code applied to the control symbol blocks C0 and C1 of a second slot and a time axis applied to the control signal symbol blocks C2 and C3 of the second slot are transmitted for one terminal. In this case, a terminal group is changed three times, and a time axis code used by each terminal is accordingly changed.

Figure 10:
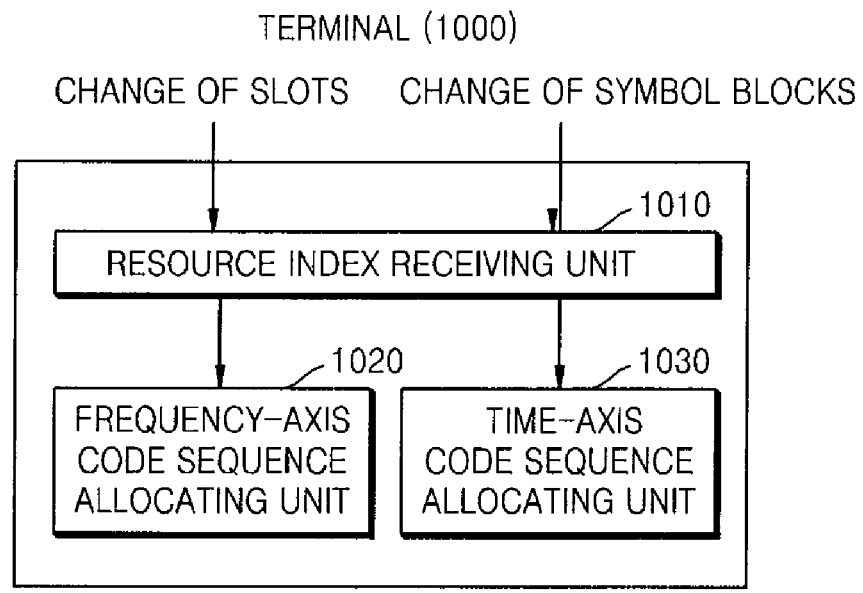
FIG. 10 is a block diagram of a terminal apparatus for mitigating interference between terminals in a wireless communication system using a method of transmitting a signal, according to an embodiment of the present invention.

FIG. 10 is a block diagram of a terminal 1000 for mitigating interference between terminals in a wireless communication system using a method of transmitting a signal, according to an embodiment of the present invention.

The terminal 1000 includes a resource index receiving unit 1010, a frequency-axis code sequence allocating unit 1020, and a time-axis code sequence allocating unit 1030. The resource index receiving unit 1010 receives a resource index according to a change in a slot or a symbol block. That is, a resource index is a basic value for determining a frequency-axis code sequence and a time-axis code sequence which are to be determined according to a change from a first slot to a second slot. A terminal receives a resource index from a base station. The terminal and the base station share a frequency-axis code sequence and a time-axis code sequence allocated to the terminal on the basis of the resource index.

The frequency-axis code sequence allocating unit 1020 determines a frequency axis code to be used by a current slot on the basis of the resource index. The determined frequency axis code is allocated to a terminal. In code hopping performed on a symbol block-by-symbol block basis, a frequency axis code to be determined according to a symbol block index that is changed whenever a symbol block is changed is determined and allocated to a terminal.

A plurality of terminals having the same frequency axis code in a first slot receive a new resource index in a second slot, and accordingly have a new frequency axis code. Also, a plurality of terminals belonging to one terminal group have a time axis code in a second slot which is different from a time axis code in a first slot. Accordingly, terminals belonging to the same terminal group in a first slot do not belong to the same terminal group in a second slot, and constitute a new terminal group together with terminals belonging to different terminal groups in the first slot. A terminal group may be changed on a symbol block-by-symbol block basis in this way.

The time-axis code sequence allocating unit 1030 calculates a time-axis code sequence to be allocated to terminals in a current slot or symbol block on the basis of the resource index that is changed according to the slot or the symbol block, and allocates the calculated time-axis code sequence to the terminal.

In order to identify terminals, a base station should know the information of a code sequence allocated to each terminal. As described above, the base station transmits a resource index and shares a time-axis code sequence and a time-axis code sequence with each terminal by using the resource index. As a result, the base station knows a frequency axis code and a time axis code of each terminal in a slot or symbol block.

The base station knows from a resource index in a first slot that a plurality of terminals have the same frequency axis code. The base station also knows from a resource index in a second slot that terminals belonging to the same terminal group in the first slot do not belong to the same terminal group, but have different frequency axis codes and belong to different terminal groups in the second slot. The base station should also know that a time axis code may be changed according to a resource index in a slot.

As described above, a time axis code allocated to terminals in a first slot is different from a time axis code allocated to the terminals in a second slot.

A base station apparatus performing the aforesaid functions will now be explained.

Figure 11:
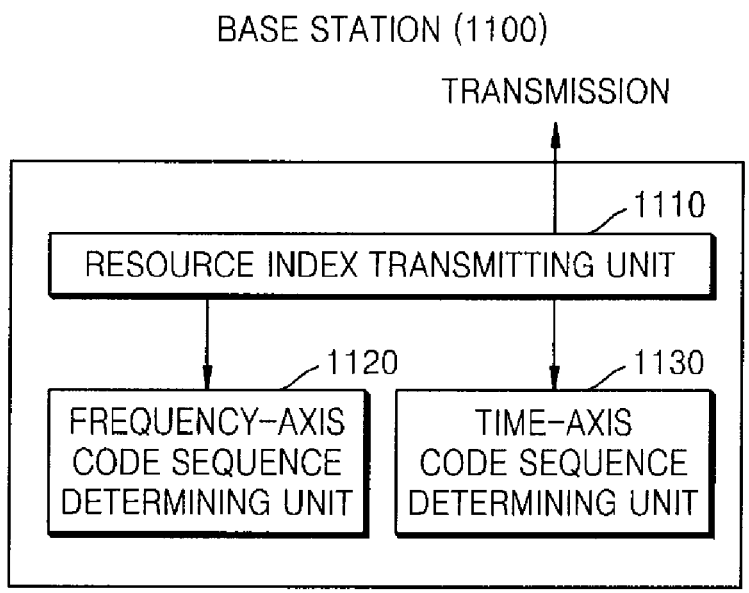
FIG. 11 is a block diagram a base station employing a method of transmitting a signal, according to an embodiment of the present invention

FIG. 11 is a block diagram illustrating a base station 1100 employing a method of transmitting a signal, according to an embodiment of the present invention.

Referring to FIG. 11, the base station 1100 includes a resource index transmitting unit 1110, a frequency-axis code sequence determining unit 1120, and a time-axis code sequence determining unit 1130. The resource index transmitting unit 1110 transmits a resource index, which is changed according to a change in a slot or a symbol block, to terminals. The frequency-axis code sequence determining unit 1120 determines a frequency-axis code sequence according to the resource index. The time-axis code sequence determining unit 1130 determines a time-axis code sequence according to the resource index.

Code hopping according to the present invention may be embodied as computer-readable codes on a computer-readable recording medium. The computer-readable recording medium is any data storage device that can store data that can be thereafter read by a computer system. Examples of the computer-readable recording medium include read-only memories (ROMs), random-access memories (RAMs), CD-ROMs, magnetic tapes, floppy disks, optical data storage devices, and carrier waves (such as data transmission through the Internet).

The computer-readable recording medium can also be distributed over network coupled computer systems so that the compute readable code is stored and executed in a distributed fashion. Functional programs, codes, and code segments for embodying the present invention may be easily deducted by programmers in the art to which the present invention belongs.

While the present invention has been particularly shown and described with reference to exemplary embodiments thereof, it will be understood by one of ordinary skill in the art that various changes in form and detail may be made therein without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of receiving an uplink signal by a base station of a wireless communication system using a plurality of slots, each slot including a plurality of symbol blocks in a time domain, the method comprising:
   determining a first code and a second code, the first code being hopped by a symbol block and a slot, and the second code being hopped by the slot; and
   receiving an uplink signal using the first code and the second code from a terminal,
   wherein the plurality of symbol blocks of each slot includes a first symbol block, a second symbol block, a third symbol block, a fourth symbol block, a fifth symbol block, a sixth symbol block, and a seventh symbol block that are sequentially arranged in a time domain,
   wherein the first, second, sixth and seventh symbol blocks are used to carry a control signal, and
   wherein the third, fourth and fifth symbol blocks are used to carry a reference signal.

2. The method of claim 1, wherein the first code determines a cyclic shift of the uplink signal.

3. The method of claim 1, wherein the second code is an orthogonal cover of the uplink signal.

4. The method of claim 1, wherein the uplink signal includes the reference signal, and
   wherein the second code uses an orthogonal sequence whose length is three.

5. The method of claim 1, wherein the uplink signal includes the control signal of ACK/NAK, and
   wherein the second code uses an orthogonal sequence whose length is four.

6. A method of transmitting an uplink signal by a terminal of a wireless communication system using a plurality of slots, each slot including a plurality of symbol blocks in a time domain, the method comprising:
   determining a first code and a second code, the first code being hopped by a symbol block and a slot, and the second code being hopped by the slot; and
   transmitting an uplink signal using the first code and the second code to a base station,
   wherein the plurality of symbol blocks of each slot includes a first symbol block, a second symbol block, a third symbol block, a fourth symbol block, a fifth symbol block, a sixth symbol block, and a seventh symbol block that are sequentially arranged in the time domain,
   wherein the first, second, sixth and seventh symbol blocks are used to carry a control signal, and
   wherein the third, fourth and fifth symbol blocks are used to carry a reference signal.

7. The method of claim 6, wherein the first code determines a cyclic shift of the uplink signal.

8. The method of claim 6, wherein the second code is an orthogonal cover of the uplink signal.

9. The method of claim 6, wherein the uplink signal includes the reference signal, and
   wherein the second code uses an orthogonal sequence whose length is three.

10. The method of claim 6, wherein the uplink signal includes the control signal of ACK/NAK, and
    wherein the second code uses an orthogonal sequence whose length is four.

11. An apparatus for receiving an uplink signal in a wireless communication system using a plurality of slots, each slot including a plurality of symbol blocks in a time domain, the apparatus comprising:
    a code sequence determining unit configured to determine a first code and a second code, the first code being hopped by a symbol block and a slot, and the second code being hopped by the slot; and
    a receiving unit configured to receive an uplink signal using the first code and the second code from a terminal,
    wherein the plurality of symbol blocks of each slot includes a first symbol block, a second symbol block, a third symbol block, a fourth symbol block, a fifth symbol block, a sixth symbol block, and a seventh symbol block that are sequentially arranged in a time domain,
    wherein the first, second, sixth and seventh symbol blocks are used to carry a control signal, and
    wherein the third, fourth and fifth symbol blocks are used to carry a reference signal.

12. The apparatus of claim 11, wherein the first code determines a cyclic shift of the uplink signal.

13. The apparatus of claim 11, wherein the second code is an orthogonal cover of the uplink signal.

14. The apparatus of claim 11, wherein the uplink signal includes the reference signal, and
    wherein the second code uses an orthogonal sequence whose length is three.

15. The apparatus of claim 11, wherein the uplink signal includes the control signal of ACK/NAK, and
    wherein the second code uses an orthogonal sequence whose length is four.

16. An apparatus for transmitting an uplink signal in a wireless communication system using a plurality of slots, each slot including a plurality of symbol blocks in a time domain, the method comprising:
    a first unit configured to determine a first code and a second code, the first code being hopped by a symbol block and a slot, and the second code being hopped by the slot; and
    a second unit configured to transmit an uplink signal using the first code and the second code to a base station,
    wherein the plurality of symbol blocks of each slot includes a first symbol block, a second symbol block, a third symbol block, a fourth symbol block, a fifth symbol block, a sixth symbol block, and a seventh symbol block that are sequentially arranged in the time domain,
    wherein the first, second, sixth and seventh symbol blocks are used to carry a control signal, and
    wherein the third, fourth and fifth symbol blocks are used to carry a reference signal.

17. The apparatus of claim 16, wherein the first code determines a cyclic shift of the uplink signal.

18. The apparatus of claim 16, wherein the second code is an orthogonal cover of the uplink signal.

19. The apparatus of claim 16, wherein the uplink signal includes the reference signal, and
    wherein the second code uses an orthogonal sequence whose length is three.

20. The apparatus of claim 16, wherein the uplink signal includes the control signal of ACK/NAK, and wherein the second code uses an orthogonal sequence whose length is four.

\* \* \* \* \*